(12) United States Patent
Lin

(10) Patent No.: US 8,844,034 B2
(45) Date of Patent: Sep. 23, 2014

(54) METHOD AND APPARATUS FOR DETECTING AND DEFENDING AGAINST CC ATTACK

(75) Inventor: Guoqiang Lin, Shenzhen (CN)

(73) Assignee: Sangfor Networks Company Limited, Shenzhen (CN)

( * ) Notice: Subject to any disclaimer, the term of this patent is extended or adjusted under 35 U.S.C. 154(b) by 239 days.

(21) Appl. No.: 13/347,709

(22) Filed: Jan. 11, 2012

(65) Prior Publication Data

US 2013/0042319 A1 Feb. 14, 2013

(30) Foreign Application Priority Data

Aug. 10, 2011 (CN) .......................... 2011 1 0228690

(51) Int. Cl.
G06F 11/00 (2006.01)
G06F 21/55 (2013.01)
H04L 29/06 (2006.01)
H04L 29/08 (2006.01)

(52) U.S. Cl.
CPC ................ *G06F 21/55* (2013.01); *H04L 69/28* (2013.01); *H04L 63/1458* (2013.01); *H04L 67/22* (2013.01); *H04L 67/02* (2013.01)
USPC ............................................. 726/23; 726/22

(58) Field of Classification Search
USPC ................... 726/11–14, 22–23, 25
See application file for complete search history.

(56) References Cited

U.S. PATENT DOCUMENTS

| | | | |
|---|---|---|---|
| 8,205,258 B1 * | 6/2012 | Chang et al. .................... | 726/22 |
| 2002/0032774 A1 * | 3/2002 | Kohler et al. ................. | 709/225 |
| 2003/0140140 A1 * | 7/2003 | Lahtinen ........................ | 709/224 |
| 2003/0145232 A1 * | 7/2003 | Poletto et al. ................. | 713/201 |
| 2006/0112174 A1 * | 5/2006 | L'Heureux et al. ........... | 709/223 |
| 2009/0271865 A1 * | 10/2009 | Jiang ............................... | 726/23 |
| 2010/0281539 A1 * | 11/2010 | Burns et al. ..................... | 726/23 |
| 2011/0016523 A1 * | 1/2011 | Oh et al. .......................... | 726/22 |
| 2011/0099622 A1 * | 4/2011 | Lee et al. ......................... | 726/13 |
| 2011/0107412 A1 * | 5/2011 | Lee et al. ......................... | 726/11 |
| 2012/0151583 A1 * | 6/2012 | Kang et al. ...................... | 726/23 |

FOREIGN PATENT DOCUMENTS

CN 101383832 A 3/2009

OTHER PUBLICATIONS

1st Office Action of Chinese Patent Application No. 201110228690.2 issued by Chinese Patent Office.
Research on Detection Methods of CC Attack. Chen Zhonghua, Zhang Lianying, Wang Xiaoming. Telecommunications Science (CN). May 31, 2009; 5: 64-65.

* cited by examiner

*Primary Examiner* — Darren B Schwartz

(57) ABSTRACT

A method for detecting and defending against a CC attack is disclosed, which comprises the following steps of: recording the number of times m of requests for a webpage and the number of times n of related requests for the webpage within a preset time interval if a user's request of accessing the webpage is a dynamic webpage request; and determining that the webpage is subjected to a CC attack if a value (m−n)/m is greater than or equal to a preset threshold. A corresponding apparatus is further disclosed. The method and the apparatus for detecting and defending against a CC attack of the present disclosure can accurately detect and defend against the CC attack.

16 Claims, 5 Drawing Sheets

METHOD AND APPARATUS FOR DETECTING AND DEFENDING AGAINST CC ATTACK

BACKGROUND

1. Technical Field

The present disclosure relates to the field of communications, and more particularly, to a method and an apparatus for detecting and defending against a Challenge Collapsar (CC) attack.

2. Description of Related Art

Accompanied with continuous development of the Internet technologies, the network security problem becomes more and more important. As one of the most commonly used means for network attacks, Distributed Denial of Service (DDoS) attacks have developed at a pace faster than the defense technologies in recent years. As the annual security report made by Arbor Networks Corporation in 2010 indicates, the traffic of DDoS attacks are increasing geometrically in recent years and have increased from 50 Gbps in 2009 to 100 GPs in 2010. Many international important events occurring in 2010 and 2011 can be attributed to DDoS attacks.

As a kind of DDoS attacks, Challenge Collapsar (CC) attacks mainly attack webpages. A CC attacker generally sends a lot of HTTP requests (e.g., forum searching) that consume system resources to a target server 11 via a proxy server 10 in the network. This will exhaust the system resources of the target server 11 and make the target server 11 unable to respond to requests of normal users.

Currently, there are only a few methods available for detecting and defending against CC attacks, and most of the methods suffer from a long lagging time and a high false rate. For example, a scheme that detects whether a server is subjected to a CC attack according to changes in a ratio of request messages to response messages just suffers from a long lagging time because the system may have already been attacked for a period of time when a significant change in the ratio of request messages to response messages is found. Furthermore, this method tends to determine a normal peak-hour access as an abnormal CC attack, so the false rate is high.

BRIEF SUMMARY

The primary objective of the present disclosure is to provide a method and an apparatus for detecting and defending against a CC attack, which can accurately detect and defend against the CC attack.

The present disclosure provides a method for detecting and defending against a CC attack, which comprises the following steps of:

recording the number of times m of requests for a webpage and the number of times n of related requests for the webpage within a preset time interval if a user's request of accessing the webpage is a dynamic webpage request; and determining that the webpage is subjected to a CC attack if a value (m−n)/m is greater than or equal to a preset threshold.

Preferably, the step of recording the number of times m of requests for a webpage and the number of times n of related requests for the webpage within a preset time interval if a user's request of accessing the webpage is a dynamic webpage request comprises:

1) determining whether the user's request of accessing a webpage is a recorded request;

2) if the user's request of accessing a webpage is a recorded request, then incrementing the number of times of the request by 1 and returning to the step 1) until the preset time expires;

3) if the user's request of accessing a webpage is not a recorded request, then determining whether the user's request of accessing a webpage is a related request of a recorded request, wherein if the answer is "yes", then the number of times of the related request is incremented by 1 and the process returns back to the step 1) until the preset time expires; and otherwise, if the answer is "no", then the user's request of accessing a webpage is recorded as a new request and the process returns to the step 1) until the preset time expires; and 4) making statistics on the number of times m of the user's requests of accessing the webpage and the number of times n of the related requests for the webpage.

Preferably, the step of making statistics on the number of times n of the related requests for the webpage comprises:

calculating the numbers of times of the related requests for the webpage respectively; and averaging the numbers of times of the related requests for the webpage to obtain the number of times of the related requests n.

Preferably, the method further comprises the following step before the step of recording the number of times m of requests for a webpage and the number of times n of related requests for the webpage within a preset time interval if a user's request of accessing the webpage is a dynamic webpage request:

determining whether the user's request of accessing the webpage is a dynamic webpage request.

Preferably, the method further comprises the following step after the step of determining that the webpage is subjected to a CC attack if a value (m−n)/m is greater than or equal to a preset threshold:

redirecting the user's request of accessing the webpage.

The present disclosure further provides an apparatus for detecting and defending against a CC attack, which comprises:

a recording module, being configured to record the number of times m of requests for a webpage and the number of times n of related requests for the webpage within a preset time interval if a user's request of accessing the webpage is a dynamic webpage request; and a determining module, being configured to determine that the webpage is subjected to a CC attack if a value (m−n)/m is greater than or equal to a preset threshold.

Preferably, the recording module comprises:

a determining unit, being configured to determine whether the user's request of accessing a webpage is a recorded request;

a webpage request times counting unit, being configured to, if the user's request of accessing a webpage is a recorded request, then increment the number of times of the request by 1 and return to the step 1) until the preset time expires;

a related request times counting unit, being configured to, if the user's request of accessing a webpage is not a recorded request, then determining whether the user's request of accessing a webpage is a related request of a recorded request, wherein if the answer is "yes", then the number of times of the related request is incremented by 1 and the process returns back to the step 1) until the preset time expires; and otherwise, if the answer is "no", then the user's request of accessing a webpage is recorded as a new request and the process returns to the step 1) until the preset time expires; and a statistic unit, being configured to make statistics on the number of times m of the user's requests of accessing the webpage and the number of times n of the related requests for the webpage.

Preferably, the statistic unit comprises:

a calculation sub-unit, being configured to calculate the numbers of times of the related requests for the webpage respectively; and an averaging unit, being configured to average the numbers of times of the related requests for the webpage to obtain the number of times of the related requests n.

Preferably, the apparatus further comprises:

a determining module, being configured to determine whether the user's request of accessing the webpage is a dynamic webpage request.

Preferably, the apparatus further comprises:

a redirecting module, being configured to redirect the user's request of accessing the webpage.

The method and the apparatus for detecting and defending against a CC attack according to the present disclosure utilize correlations between HTTP requests to detect the CC attack. When the user requests to access a webpage, the browser also requests for content (e.g., pictures, CSS, JS, etc.) of the webpage correspondingly at the same time. In view of this, the present disclosure detects whether the server is subjected to a CC attack according to correlations of webpage requests and defends accordingly. The present disclosure features a short lagging time and a low false rate, and can identify and defend against CC attacks timely and accurately.

Hereinafter, implementations, functional features and advantages of the present disclosure will be further described with reference to embodiments thereof and the attached drawings.

DETAILED DESCRIPTION

It shall be understood that, the embodiments described herein are only intended to illustrate but not to limit the present disclosure.

Figure 1:
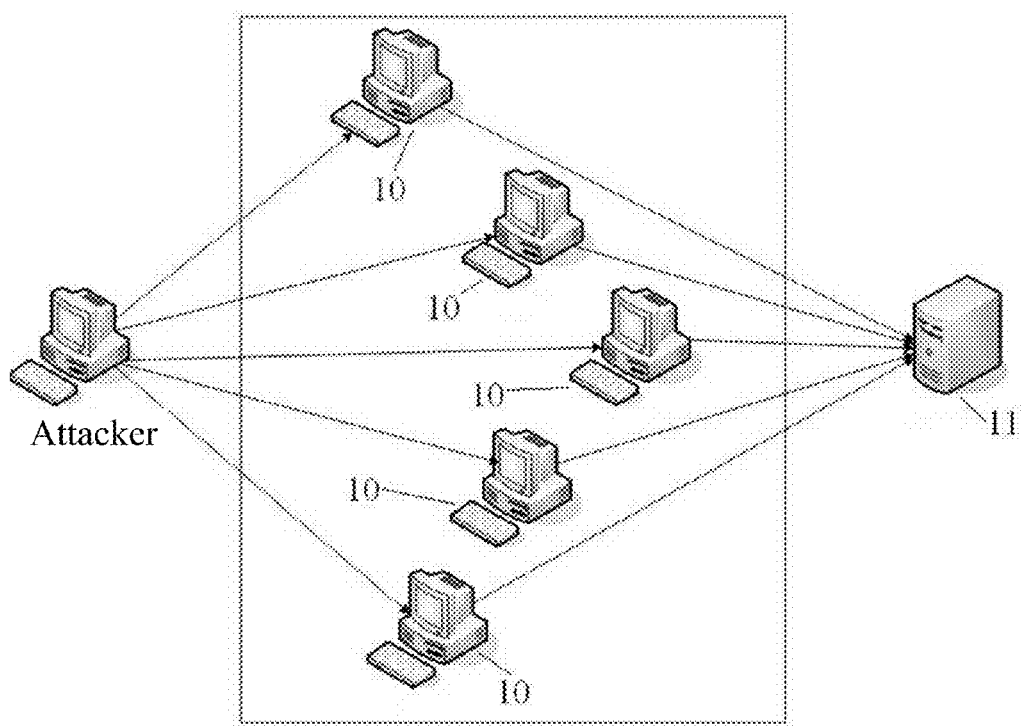
FIG. 1 is a schematic view illustrating CC attacks in the prior art.
Figure 2:
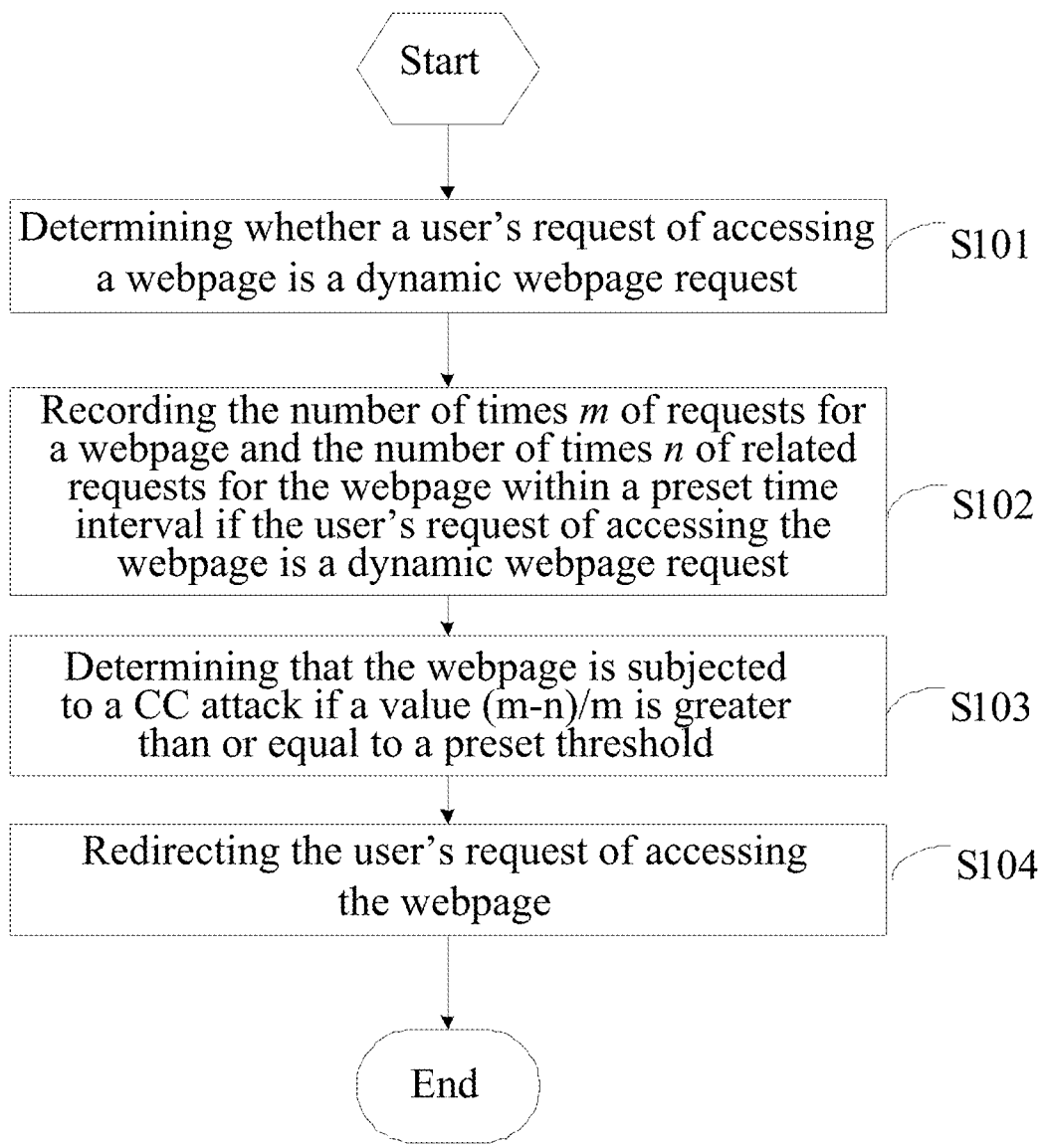
FIG. 2 is a schematic flowchart diagram of an embodiment of a method for detecting and defending against a CC attack according to the present disclosure.

Referring to FIG. 2, an embodiment of a method for detecting and defending against a CC attack is disclosed, which comprises the following steps of:

step S101: determining whether a user's request of accessing a webpage is a dynamic webpage request;

step S102: recording the number of times m of requests for the webpage and the number of times n of related requests for the webpage within a preset time interval if the user's request of accessing the webpage is a dynamic webpage request;

step S103: determining that the webpage is subjected to a CC attack if a value $(m-n)/m$ is greater than or equal to a preset threshold; and step S104: redirecting the user's request of accessing the webpage.

This embodiment provides a novel method for detecting and defending against a CC attack. When a normal user accesses a webpage via a browser, the normal user also requests related content (e.g., a css file, a javascript script file, a gif/jpg/png picture file, etc.) of the webpage at the same time; in contrast, an attacker will disconnect the link to a proxy server immediately after sending an HTTP request via the proxy server, so the attacker will not send a request for the related content of the webpage. As a result, normal traffics can be distinguished from attack traffics according to the difference between the two kinds of behaviors.

Figure 3:
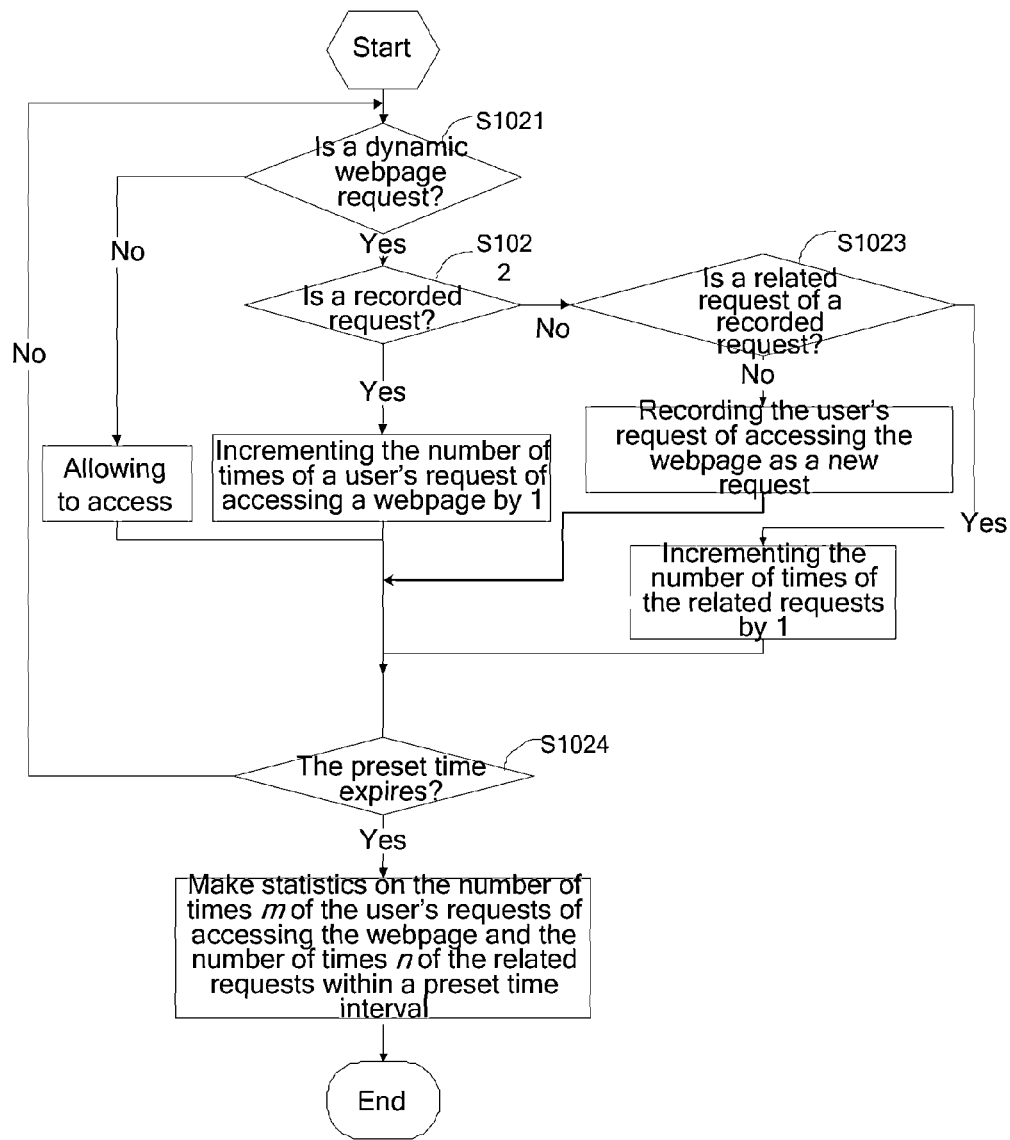
FIG. 3 is a schematic flowchart diagram of a recording process in an embodiment of the method for detecting and defending against a CC attack according to the present disclosure.

As shown in FIG. 3, the process of the step S102 is as follows.

Step S1021: detecting whether a user's request of accessing a webpage is a dynamic webpage request. If the answer is "no", then the user is allowed to access the webpage; and if the answer is "yes", then the process proceeds to the next step.

Step S1022: determining whether the request is a recorded request. If the request is a recorded request, then the number of times of the request is incremented by 1; and if the request is not a recorded request, then the process proceeds to the next step. The so-called recording step described above may be a step of recording a Url address of the HTTP request, and the recorded Url address will be subsequently used as a criterion for determining whether a request of accessing a webpage has been recorded.

Figure 4:
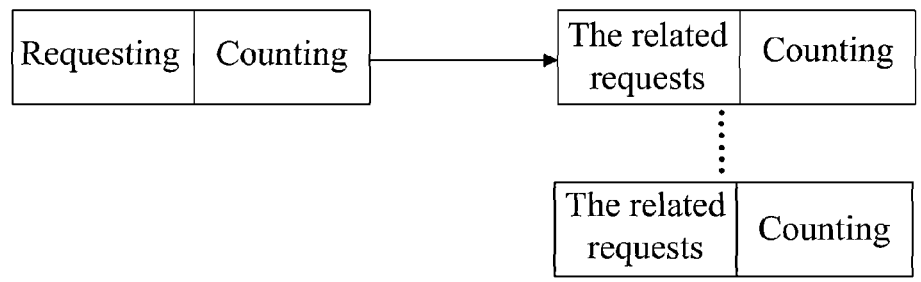
FIG. 4 is a schematic view illustrating how recorded data is organized in an embodiment of the method for detecting and defending against a CC attack according to the present disclosure.

Step S1023: determining whether the request is a related request of a recorded request. As the user's request of accessing a webpage is a dynamic webpage request, every webpage request is followed by a plurality of requests for content of the webpage (termed as related requests herein). Referring to FIG. 4, how data which need to be recorded in the detecting method of this embodiment is organized is shown therein. Every webpage request corresponds to a plurality of related requests. For example, when the homepage of www.baidu.com is to be accessed, a "GET /" request message is sent and, meanwhile, a plurality of related requests such as "GET /img/gs.gif" and "GET /img/baidu_sylogol.gif" will also be sent. The Referer fields of the related requests are all "http://www.baidu.com/". Therefore, the related requests can be recognized and recorded through the Referer field identifier in HTTP request header. If the request is a related request of a recorded request, then the number of times of the related request of the request is incremented by 1; and otherwise, the request is recorded as a new request.

Step S1024: making statistics on the number of times m of the user's requests of accessing the webpage and the number of times n of the related requests of the request within a preset time interval according to the above recorded data when the preset time expires. In practical implementations, as a webpage request may have a plurality of related requests, an average value of the numbers of times of all the related requests of the webpage is taken as a value of n. A difference $a=m-n$ is calculated. The webpage is determined to be subjected to a CC attack if a ratio $(m-n)/m$ of a to m is greater than a certain threshold which is preset in advance.

For the webpage which has been determined to be subjected to the CC attack, the request is redirected through use of HTTP redirecting technologies. As the attacker disconnects the link to the proxy server immediately after sending the request, the request cannot be redirected correctly so that the attack traffics are filtered out. In some cases, it is possible that some HTTP requests indeed don't have related requests (i.e., a request for downloading a file); and in such cases, the number of times of accessing a single IP address per unit time and the time duration of a single link can be limited to defend against the attack.

In this embodiment, correlations between HTTP requests are utilized to detect the CC attack. When the user requests to access a webpage, the browser also requests for content (e.g., pictures, CSS, JS, etc.) of the webpage correspondingly at the same time. In view of this, the present disclosure detects whether the server is subjected to a CC attack according to correlations of webpage requests and defends accordingly. The present disclosure features a short lagging time and a low false rate, and can identify and defend against CC attacks timely and accurately.

Figure 5:
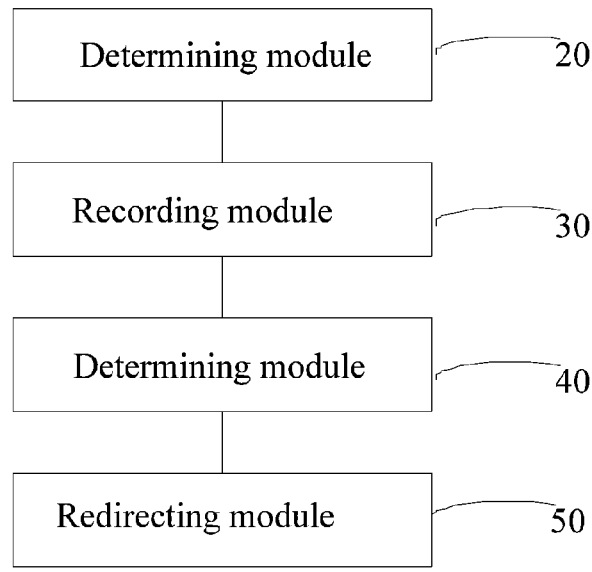
FIG. 5 is a schematic structural view of an embodiment of an apparatus for detecting and defending against a CC attack according to the present disclosure.

Referring to FIG. 5, an embodiment of an apparatus for detecting and defending against a CC attack is disclosed, which comprises:

a determining module 20, being configured to determine whether a user's request of accessing a webpage is a dynamic webpage request.

a recording module 30, being configured to record the number of times m of requests for a webpage and the number of times n of related requests for the webpage within a preset time interval if a user's request of accessing the webpage is a dynamic webpage request;

a determining module 40, being configured to determine that the webpage is subjected to a CC attack if a value (m−n)/m is greater than or equal to a preset threshold; and a redirecting module 50, being configured to redirect the user's request of accessing the webpage.

Figure 6:
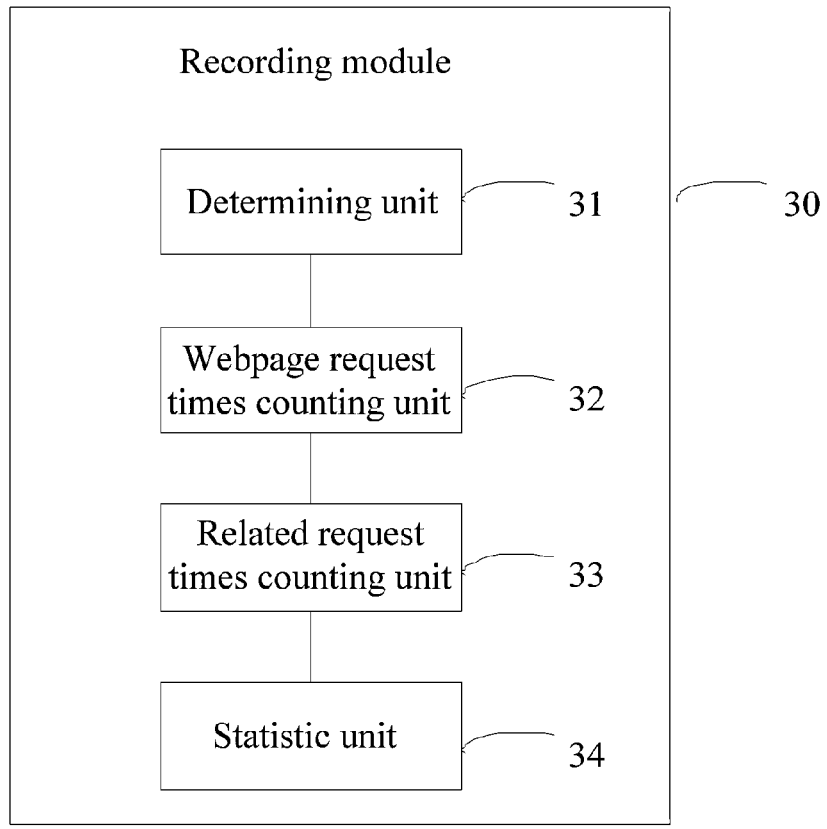
FIG. 6 is a schematic structural view of a recording module in an embodiment of the apparatus for detecting and defending against a CC attack according to the present disclosure.

Referring to FIG. 6, the recording module 30 comprises:

a determining unit 31, being configured to determine whether the user's request of accessing a webpage is a recorded request;

a webpage request times counting unit 32, being configured to, if the user's request of accessing a webpage is a recorded request, then increment the number of times of the request by 1 and return to the step 1) until the preset time expires;

a related request times counting unit 33, being configured to, if the user's request of accessing a webpage is not a recorded request, then determining whether the user's request of accessing a webpage is a related request of a recorded request, wherein if the answer is "yes", then the number of times of the related request is incremented by 1 and the process returns back to the step 1) until the preset time expires; and otherwise, if the answer is "no", then the user's request of accessing a webpage is recorded as a new request and the process returns to the step 1) until the preset time expires; and a statistic unit 34, being configured to make statistics on the number of times m of the user's requests of accessing the webpage and the number of times n of the related requests for the webpage.

Figure 7:
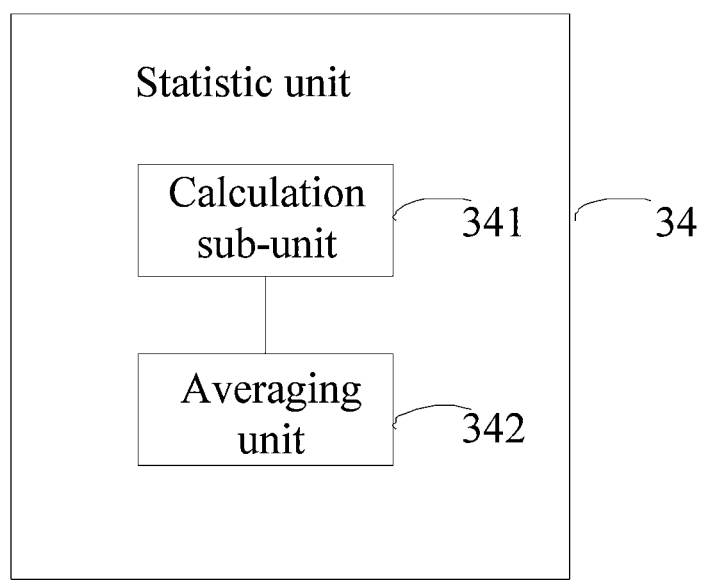
FIG. 7 is a schematic structural view of a statistic unit in an embodiment of the apparatus for detecting and defending against a CC attack according to the present disclosure.

Referring to FIG. 7, the statistic unit 34 further comprises:

a calculation sub-unit 341, being configured to calculate the numbers of times of the related requests for the webpage respectively; and an averaging unit 342, being configured to average the numbers of times of the related requests for the webpage to obtain the number of times of the related requests n.

This embodiment provides a novel apparatus for detecting and defending against a CC attack, which is built in or disposed outside a server. When a normal user accesses a webpage via a browser, the normal user also requests related content (e.g., a css file, a javascript script file, a gif/jpg/png picture file, etc.) of the webpage at the same time; in contrast, an attacker will disconnect the link to a proxy server immediately after sending an HTTP request via the proxy server, so the attacker will not send a request for the related content of the webpage. As a result, normal traffics can be distinguished from attack traffics according to the difference between the two kinds of behaviors.

The determining module 20 detects whether a user's request of accessing a webpage is a dynamic webpage request. If the answer is "no", then the user is allowed to access the webpage; and if the answer is "yes", then the determining unit 31 of the recording module 30 determines whether the request is a recorded request. If the request is a recorded request, then the number of times of the request is incremented by 1 by the webpage request times counting unit 32 and the process returns back to the step of the determining module 20 detects whether a new request of accessing a webpage is a recorded request until the preset time expires. The so-called recording step described above may be a step of recording an Url address of the HTTP request, and the recorded Url address will be subsequently used as a criterion for determining whether a request of accessing a webpage has been recorded later.

If the request is not a recorded request, then the related request times counting unit 33 determines whether the request is a related request of a recorded request. As the user's request of accessing a webpage is a dynamic webpage request, every webpage request is followed by a plurality of requests for content of the webpage (termed as related requests herein). Referring to FIG. 4, how data which need to be recorded in the detecting method of this embodiment is organized is shown therein. Every webpage request corresponds to a plurality of related requests. For example, when the homepage of www.baidu.com is to be accessed, a "GET /" request message is sent and, meanwhile, a plurality of related requests such as "GET /img/gs.gif" and "GET /img/baidu_sylogol.gif" will also be sent. The Referer fields of the related requests are all "http://www.baidu.com/". Therefore, the related request times counting unit 33 can recognize and record the related requests through the Referer field identifier in HTTP request header. That is, if the request is a related request of a recorded request, then the number of times of the related request of the request is incremented by 1 by the related request times counting unit 33 and; again, the determining unit 31 determines whether a next request of accessing a webpage is a recorded request until the preset time expires.

If the user's request of accessing a webpage is neither a recorded request nor a related request of a recorded request, then the request is recorded as a new request by the related request times counting unit 33 and, again, the determining unit 31 determines whether a next request of accessing a webpage is a recorded request until the preset time expires.

When the preset time expires, the calculation sub-unit 341 of the statistic unit 34 is configured to calculate the number of times m of the user's requests of accessing the same webpage and the numbers of times n of related requests of the request respectively within the preset time interval according to the above recorded data. In practical implementations, as a webpage request may have a plurality of related requests, an average value of the numbers of times of all the related requests of the webpage is taken as a value of n by the averaging unit 342. A difference a=m−n is calculated. If the determining module 40 determines that a ratio (m−n)/m of a to in is greater than a certain threshold which is preset in advance, then the webpage is subjected to a CC attack.

For the webpage which has been determined to be subjected to the CC attack, the redirecting module 50 redirects the request through use of HTTP redirecting technologies. As the attacker disconnects the link to the proxy server immediately after sending the request, the request cannot be redirected correctly so that the attack traffics are filtered out. In some cases, it is possible that some HTTP requests indeed don't have related requests (i.e., a request for downloading a file); and in such case, the number of times of accessing a single IP address per unit time and the time duration of a single link can be limited to defend against the attack.

In this embodiment, correlations between HTTP requests are utilized to detect the CC attack. When the user requests to access a webpage, the browser also requests for content (e.g., pictures, CSS, JS, etc.) of the webpage correspondingly at the same time. In view of this, the present disclosure detects whether the server is subjected to a CC attack according to correlations of webpage requests and defends accordingly. The present disclosure features a short lagging time and a low false rate, and can identify and defend against CC attacks timely and accurately. What described above are only preferred embodiments of the present disclosure but are not intended to limit the scope of the present disclosure. Accordingly, any equivalent structural or process flow modifications that are made on basis of the specification and the attached drawings or any direct or indirect applications in other technical fields shall also fall within the scope of the present disclosure.

The invention claimed is:

1. A method for detecting and defending against a Challenge Collapsar (CC) attack, comprising the steps of:
   recording a number of times m of requests for a webpage and a number of times n of related requests for the webpage within a preset time interval if a user's request of accessing the webpage is a dynamic webpage request; and
   determining that the webpage is subjected to the CC attack if a value (m−n)/m is greater than or equal to a preset threshold;
   wherein the step of recording the number of times m of requests for the webpage and the number of times n of related requests for the webpage within the preset time interval if the user's request of accessing the webpage is the dynamic webpage request comprises:
   (a) determining whether the user's request of accessing the webpage is a recorded request;
   (b) if the user's request of accessing the webpage is the recorded request, then incrementing the number of times of the request by one and returning to the step (a) until a preset time expires;
   (c) if the user's request of accessing the webpage is not the recorded request, then determining whether the user's request of accessing the webpage is a related request of the recorded request, wherein if an answer is "yes", then the number of times of the related request is incremented by one and returns back to the step (a) until the preset time expires; and otherwise, if the answer is "no", then the user's request of accessing the webpage is recorded as a new request and returns to the step (a) until the preset time expires; and
   (d) calculating statistics on the number of times m of the user's requests of accessing the webpage and the number of times n of the related requests for the webpage.

2. The method of claim 1, wherein the step of calculating statistics on the number of times n of the related requests for the webpage comprises:
   calculating the numbers of times of the related requests for the webpage respectively; and
   averaging the numbers of times of the related requests for the webpage to obtain the number of times of the related requests n.

3. The method of claim 2, wherein the method further comprises before the step of recording the number of times m of requests for the webpage and the number of times n of related requests for the webpage within the preset time interval if the user's request of accessing the webpage is the dynamic webpage request:
   determining whether the user's request of accessing the webpage is the dynamic webpage request.

4. The method of claim 2, wherein the method further comprises after the step of determining that the webpage is subjected to the CC attack if the value (m−n)/m is greater than or equal to the preset threshold:
   redirecting the user's request of accessing the webpage.

5. The method of claim 1, wherein the method further comprises before the step of recording the number of times m of requests for the webpage and the number of times n of related requests for the webpage within the preset time interval if the user's request of accessing the webpage is the dynamic webpage request:
   determining whether the user's request of accessing the webpage is the dynamic webpage request.

6. The method of claim 1, wherein the method further comprises after the step of determining that the webpage is subjected to the CC attack if the value (m−n)/m is greater than or equal to the preset threshold:
   redirecting the user's request of accessing the webpage.

7. The method of claim 1, wherein the method further comprises before the step of recording the number of times m of requests for the webpage and the number of times n of related requests for the webpage within the preset time interval if the user's request of accessing the webpage is the dynamic webpage request:
   determining whether the user's request of accessing the webpage is the dynamic webpage request.

8. The method of claim 1, wherein the method further comprises after the step of determining that the webpage is subjected to the CC attack if the value (m−n)/m is greater than or equal to the preset threshold:
   redirecting the user's request of accessing the webpage.

9. An apparatus for detecting and defending against a CC attack, comprising:
   a recording module, configured to record a number of times m of requests for a webpage and a number of times n of related requests for the webpage within a preset time interval if a user's request of accessing the webpage is a dynamic webpage request; and
   a determining module, configured to determine that the webpage is subjected to the CC attack if a value (m−n)/m is greater than or equal to a preset threshold;
   wherein the recording module comprises:
   a determining unit, configured to determine whether the user's request of accessing the webpage is a recorded request;
   a webpage request times counting unit, configured to determine if the user's request of accessing the webpage is the recorded request, then increment the number of times of the request by one and return to determine whether the user's request of accessing the webpage is the recorded request until a preset time expires;

a related request times counting unit, configured to determine if the user's request of accessing the webpage is not the recorded request, then determine whether the user's request of accessing the webpage is a related request of the recorded request, wherein if an answer is "yes", then the number of times of the related request is incremented by one and returns back to determine whether the user's request of accessing the webpage is the recorded request until the preset time expires; and otherwise, if the answer is "no", then the user's request of accessing the webpage is recorded as a new request and returns to determine whether the user's request of accessing the webpage is the recorded request until the preset time expires; and a statistic unit, configured to calculate statistics on the number of times m of the user's requests of accessing the webpage and the number of times n of the related requests for the webpage.

10. The apparatus of claim 9, wherein the statistic unit comprises:

a calculation sub-unit, configured to calculate the numbers of times of the related requests for the webpage respectively; and an averaging unit, configured to average the numbers of times of the related requests for the webpage to obtain the number of times of the related requests n.

11. The apparatus of claim 10, further comprising:

a determining module, configured to determine whether the user's request of accessing the webpage is the dynamic webpage request.

12. The apparatus of claim 10, further comprising:

a redirecting module, configured to redirect the user's request of accessing the webpage.

13. The apparatus of claim 9, further comprising:

a determining module, configured to determine whether the user's request of accessing the webpage is the dynamic webpage request.

14. The apparatus of claim 9, further comprising:

a redirecting module, configured to redirect the user's request of accessing the webpage.

15. The apparatus of claim 9, further comprising:

a determining module, configured to determine whether the user's request of accessing the webpage is the dynamic webpage request.

16. The apparatus of claim 9, further comprising:

a redirecting module, configured to redirect the user's request of accessing the webpage.

\* \* \* \* \*